Sept. 10, 1929.   C. C. FARMER   1,727,369
RESERVOIR RELEASE VALVE
Filed April 9, 1928
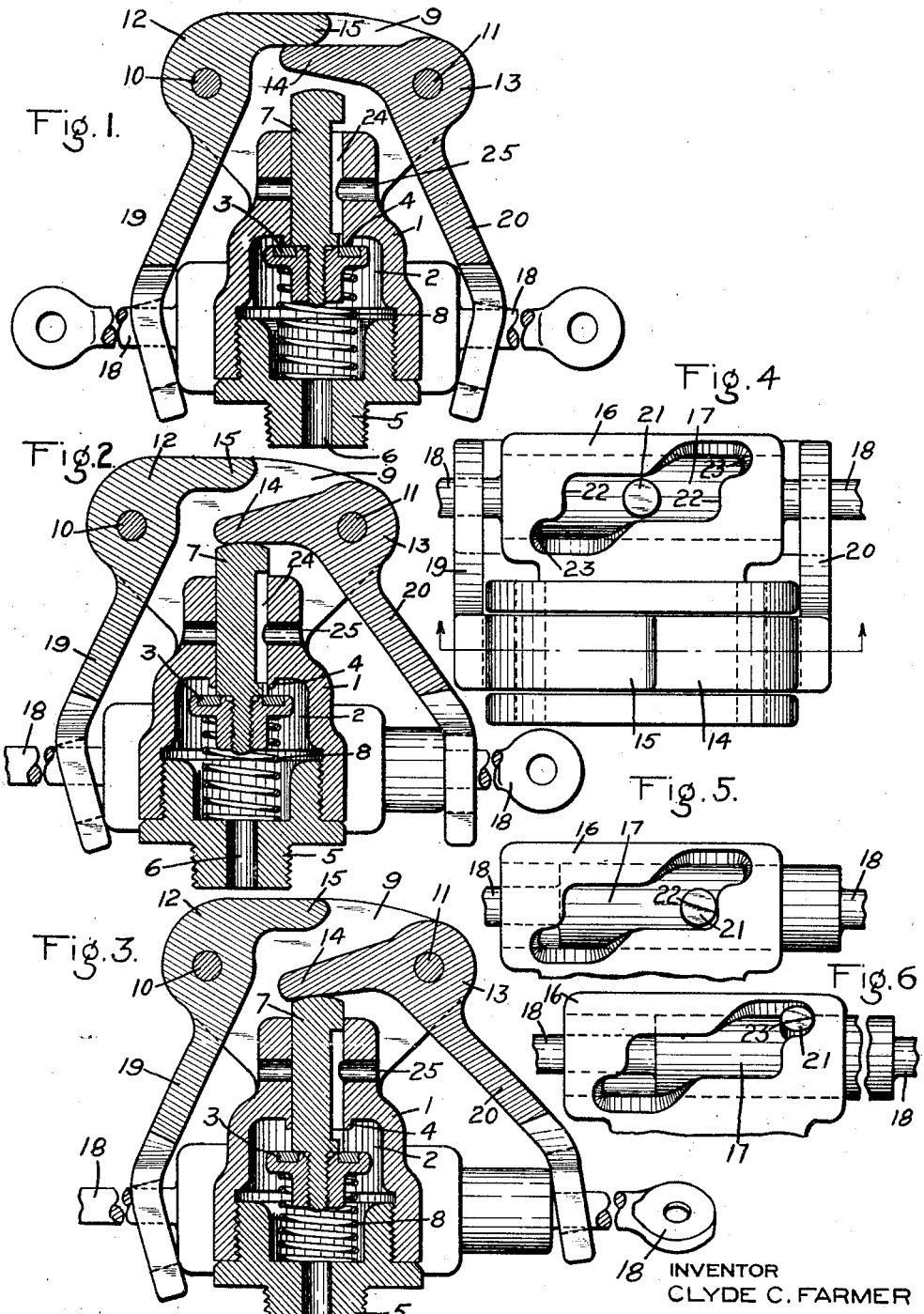
INVENTOR
CLYDE C. FARMER
BY Wm. M. Cady
ATTORNEY Patented Sept. 10, 1929.

1,727,369

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

RESERVOIR RELEASE VALVE.

Application filed April 9, 1928. Serial No. 268,477.

This invention relates to release valves and more particularly to a valve device for effecting the release of fluid under pressure from the auxiliary reservoir of a fluid pressure brake system.

It has been found desirable to be able to release fluid under pressure from the auxiliary reservoir at one time at a slow rate and at another time at a rapid rate.

The principal object of my invention is to provide an auxiliary reservoir release valve device having means for effecting the release of fluid under pressure from the auxiliary reservoir at a slow rate or at a fast rate, as desired.

In the accompanying drawing; Fig. 1 is a sectional view of an auxiliary reservoir release valve device embodying my invention, and showing the valve in its normal closed position; Fig. 2 a view similar to Fig. 1, showing the release valve in its slow release position; Fig. 3 a view similar to Fig. 1, showing the release valve in its rapid release position; Fig. 4 a plan view of the release valve device shown in Fig. 1; Fig. 5 a partial plan view of the release valve device, showing the position of the parts for slow release; and Fig. 6 a view similar to Fig. 5, showing the parts in rapid release position.

As shown in the drawing, the release valve device may comprise a casing 1 having a chamber 2, containing a release valve 3 adapted in its seated position to engage a seat ring 4. The casing 1 is secured by screw threads to a plug 5, which is screwed into a threaded opening of the auxiliary reservoir (not shown) and which is provided with a passage 6, connecting the auxiliary reservoir with the chamber 2.

The valve 3 carries a guide and operating stem 7 which extends out of the casing through a bore in the casing. The valve 3 is subject to the pressure of a coil spring 8, tending to seat the valve.

The casing 1 is provided with a bracket plate 9 carrying pins 10 and 11 on which bell cranks 12 and 13 are pivotally mounted. One arm 14 of the bell crank 13 is adapted to directly engage the outer end of the stem 7 and one arm 15 of the bell crank 12 engages the arm 14.

Associated with the casing 1 is a portion 16 having a bore in which a cylindrical member 17 is slidably mounted. A rod 18 extends out from each end of the member 17 and by pulling either rod, the member 17 may be operated.

The arm 19 of the bell crank 12 is provided with a slot through which the rod 18 at that side extends and the arm 20 of the bell crank 13 is provided with a similar slot through which the corresponding rod 18 extends.

Projecting from the member 17 is a pin 21, which extends into a space formed by cutting out the side wall of the portion 16. Longitudinal movement of member 17 in either direction from its neutral position is limited by engagement of pin 21 with a side wall 22 and upon a partial rotation of the member 17, the said member may be longitudinally moved a further distance, limited by the engagement of pin 21 with a side wall 23.

In operation, the parts are normally positioned as shown in Figs. 1 and 4, with the release valve 3 held seated by the spring 8. If it is desired to release fluid from the auxiliary reservoir at a slow rate, either one of the rods 18 is pulled out until the pin 21 engages one of the side walls 22. If the right hand rod 18 be pulled out, the member 17 will push the arm 20 toward the right, so that the arm 14 of the bell crank 13 will engage the stem 7 and the stem will be shifted downwardly so as to unseat the valve 3. The extent to which the valve 3 is opened, is limited by the engagement of the pin 21 with the side wall 22, and the opening is such that fluid is vented from the auxiliary reservoir at a slow rate by way of the groove 24 in the stem 7 and the atmospheric port 25.

If the rod 18 at the left be pulled out, the bell crank 12 will be operated and the valve 3 will be unseated by the movement of the arm 15, through engagement with the arm 14.

If it is desired to vent fluid from the auxiliary reservoir at a rapid rate, the member 17 is partially rotated, as it is pulled out, so that the pin 21 can move longitudinally, until the pin engages the side wall 23.

When the rod 18, which has been previously pulled out to open the release valve 3, is released, the spring 8 acts to return the valve 3 to its seat.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure release valve device, the combination with a release valve, of a member for operating said valve, a manually operable slide adapted to engage and operate said member, an abutment for limiting the movement of said slide, and an abutment for limiting the further movement of said slide upon a partial rotation of said slide.

2. In a fluid pressure release valve device, the combination with a release valve, of a member for operating said valve and provided with an arm, a slidable member adapted to engage and move said arm, a pin carried by said slidable member, an abutment engageable by said pin, upon a predetermined movement of said slidable member, and an abutment engageable by said pin upon a predetermined further movement of said slidable member and a partial rotation thereof.

3. In a fluid pressure release valve device, the combination with a casing and a release valve mounted in said casing, of a member for operating said valve and provided with an arm, a portion cast integral with said casing and having a cylindrical bore, a member slidable in said bore and operable manually to engage and move said arm.

In testimony whereof I have hereunto set my hand.

CLYDE C. FARMER.